April 11, 1972  ISAO HAYASHI  3,655,849
MANUFACTURING OF SUN VISORS OR GLARE SHIELDS FOR MOTOR VEHICLES
Filed Nov. 12, 1969  9 Sheets-Sheet 1
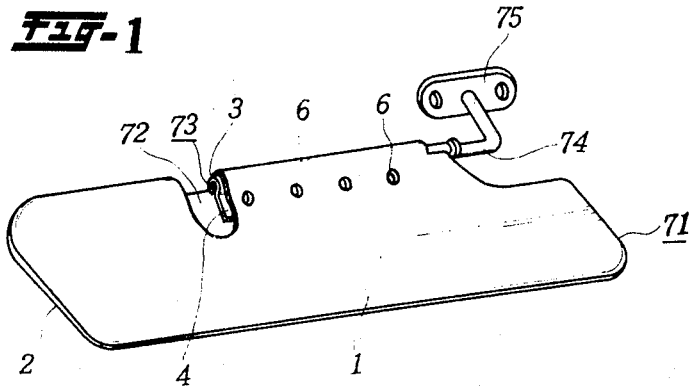
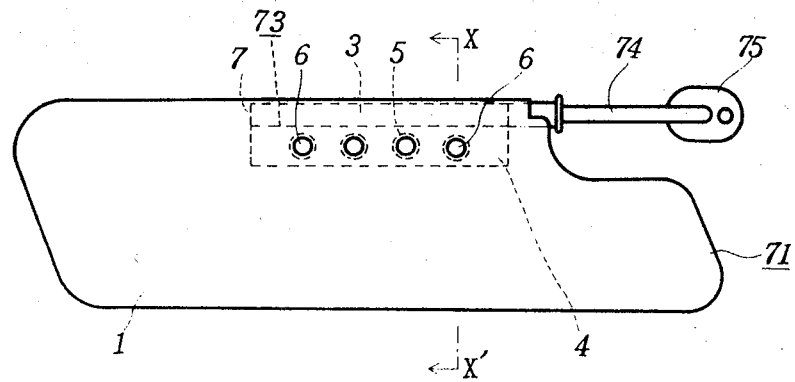
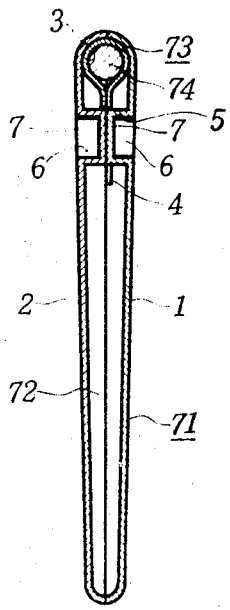
Isao Hayashi
INVENTOR
BY George B Oujevolk
ATTORNEY

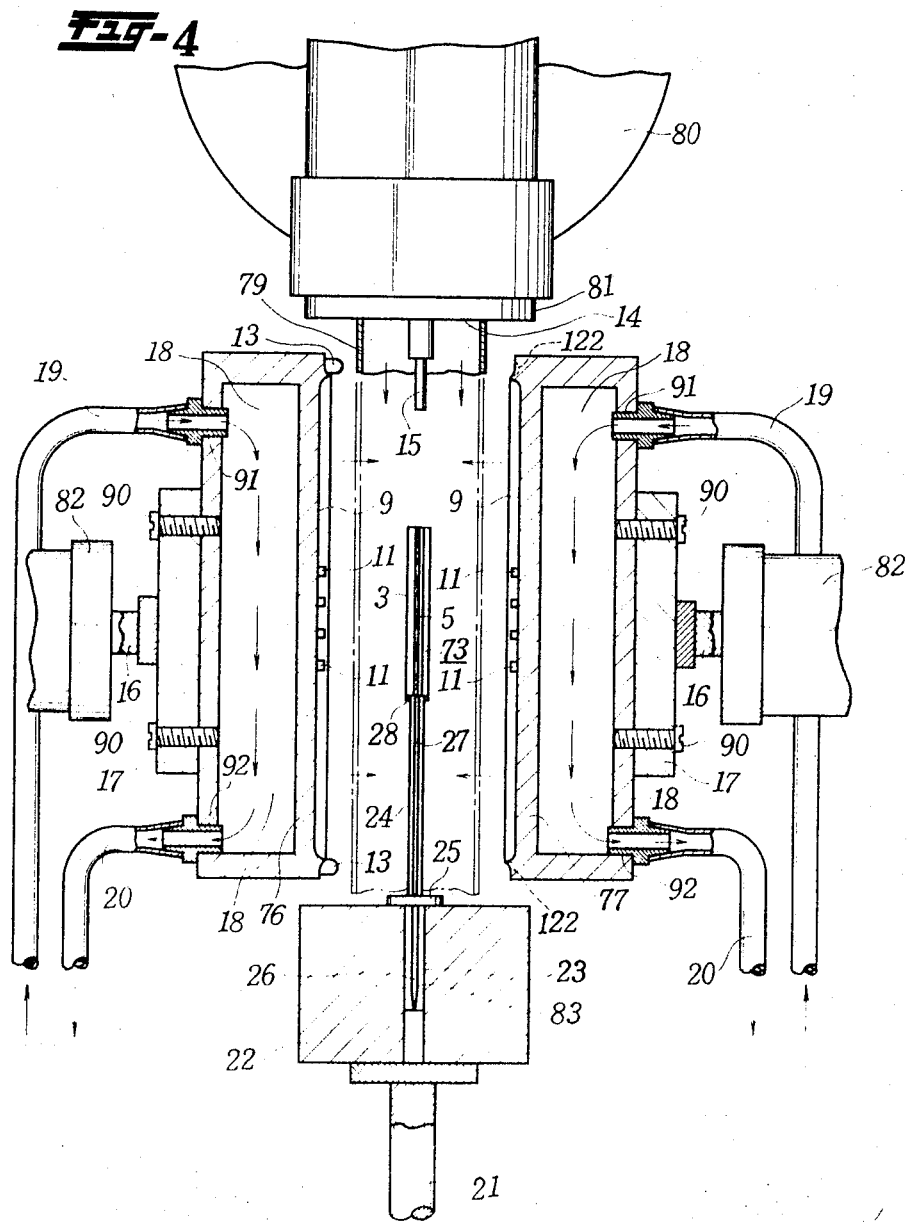

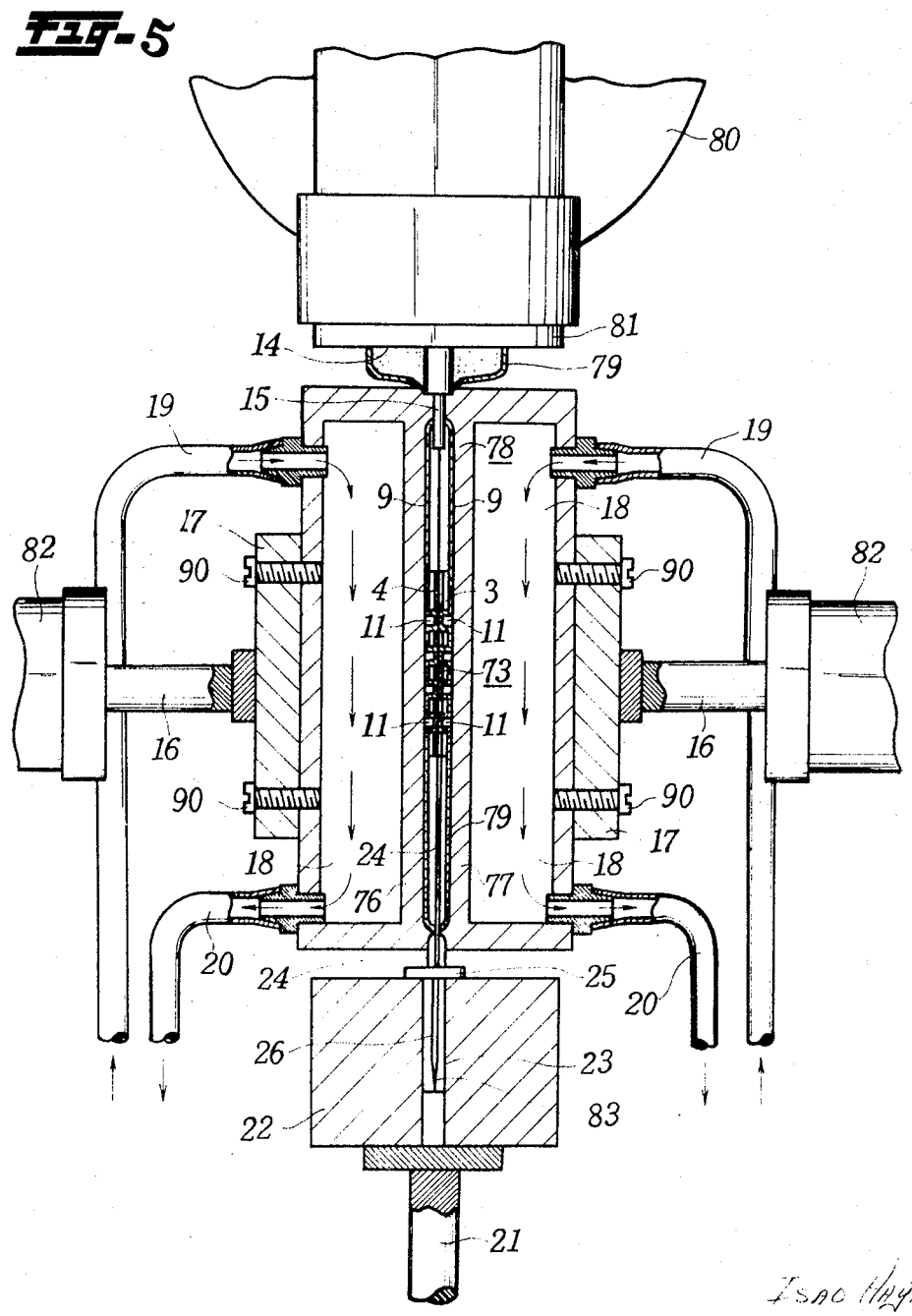

April 11, 1972  ISAO HAYASHI  3,655,849
MANUFACTURING OF SUN VISORS OR GLARE SHIELDS FOR MOTOR VEHICLES
Filed Nov. 12, 1969  9 Sheets-Sheet 4
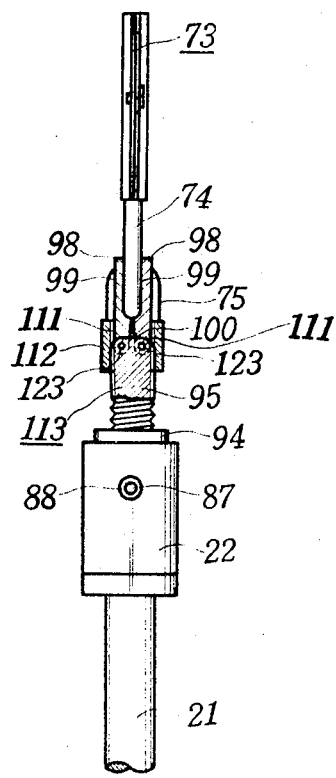
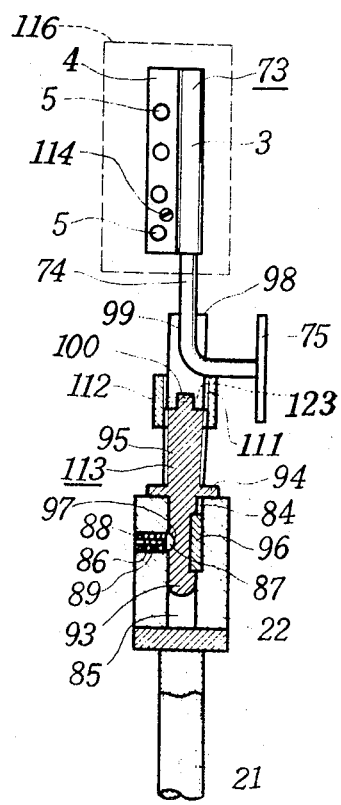
Isao Hayashi
INVENTOR
BY
ATTORNEY

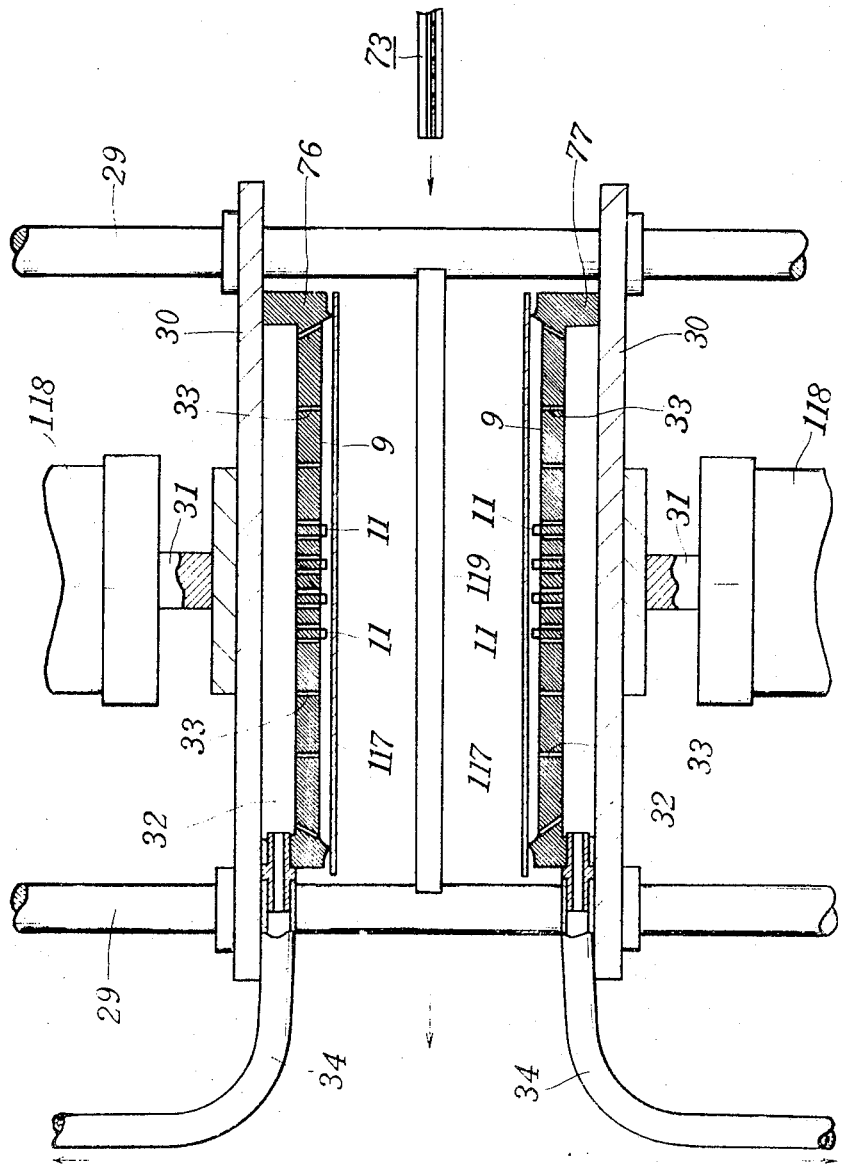

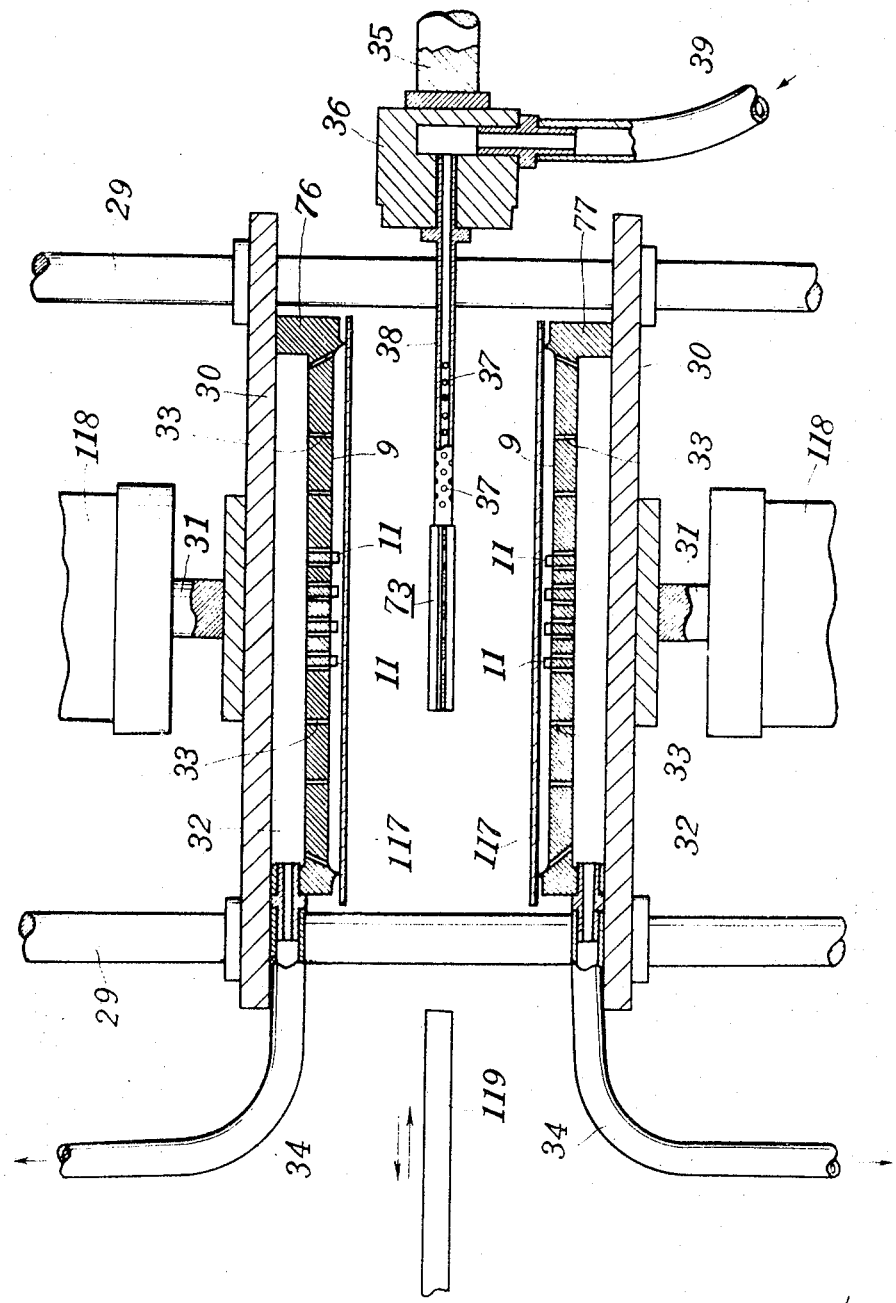

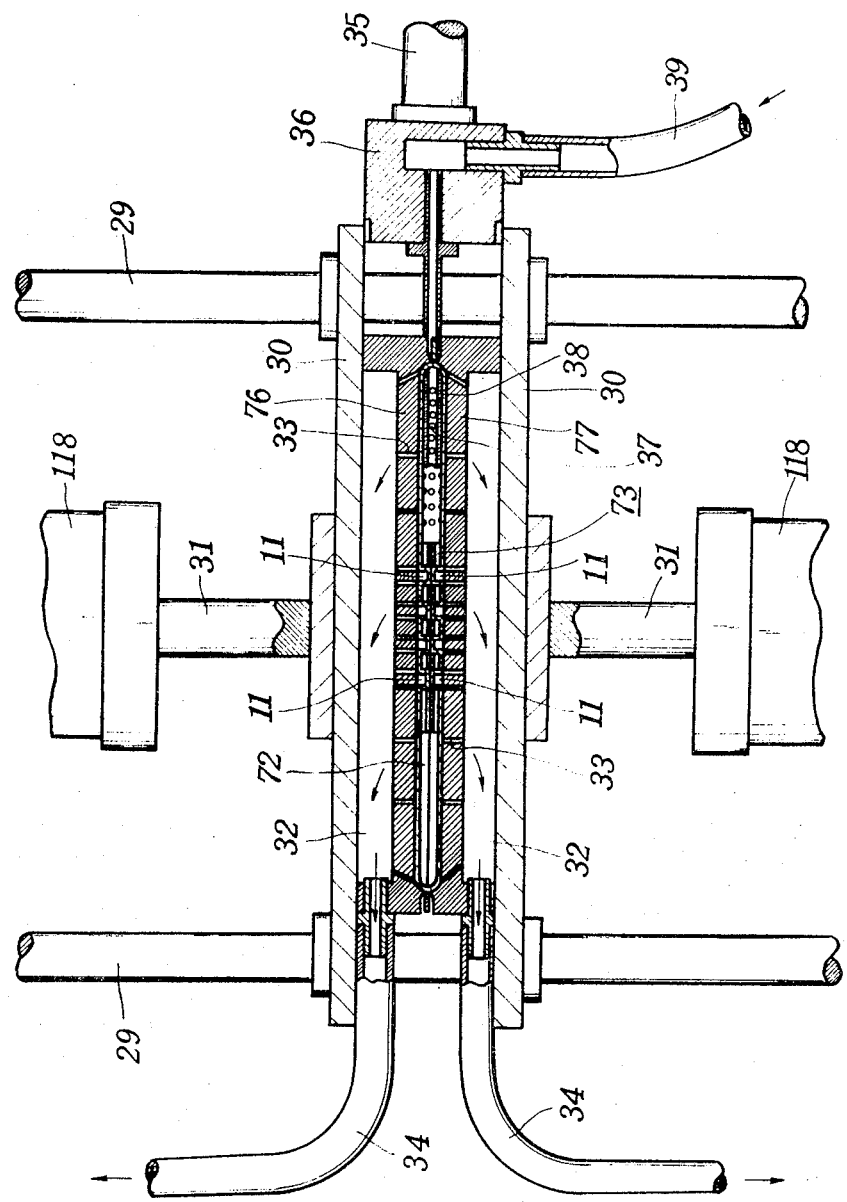

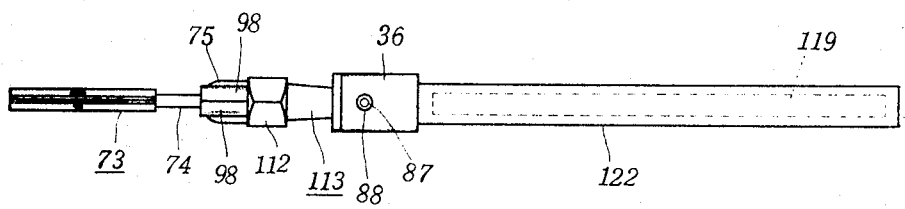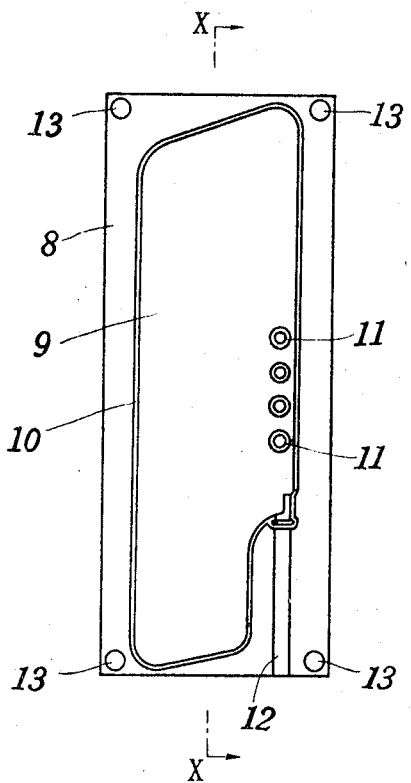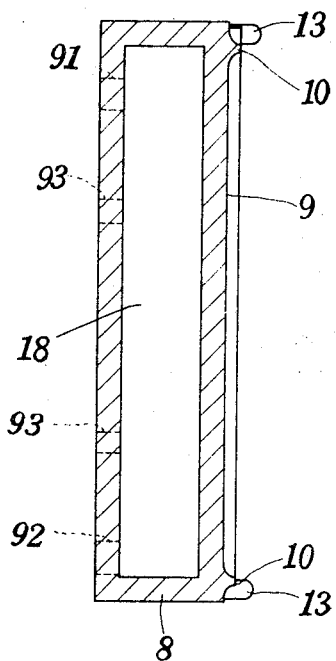

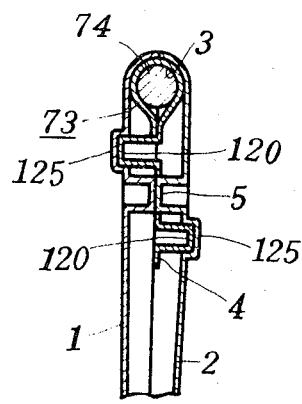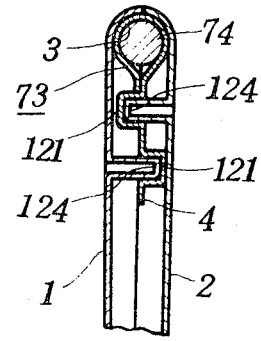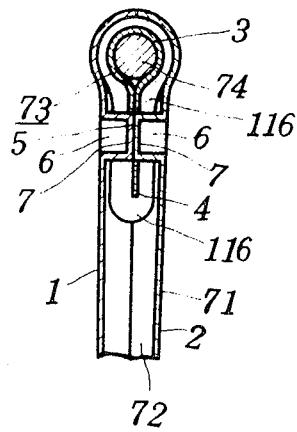

United States Patent Office 3,655,849
Patented Apr. 11, 1972

3,655,849
MANUFACTURING OF SUN VISORS OR GLARE
SHIELDS FOR MOTOR VEHICLES
Isao Hayashi, Nagoya, Japan, assignor to Hayashi
Telempu Co., Ltd., Nagoya, Japan
Filed Nov. 12, 1969, Ser. No. 876,149
Claims priority, application Japan, Nov. 15, 1968,
43/83,645
Int. Cl. B29c 17/07
U.S. Cl. 264—98                                    5 Claims

ABSTRACT OF THE DISCLOSURE

The present invention relates to a new method of manufacturing of sun visors or glare shields to be fitted inside motor vehicles, forming a hollow shell construction with synthetic resin, disposing simultaneously a bearing member therein which is to engage with a supporting rod and to be locked in eyelet shape to the concave portions formed at a desired interior portions of the shell as parts thereof.

This invention relates to an entirely new method of manufacturing sun visors or glare shields and more particularly to adjustable sun visors or glare shields to be fitted inside motor vehicles.

The primary object of the present invention is to provide a method of forming two shells simultaneously which have the required shape to manufacture sun visors of hollow shell structure.

It is another object of this invention to provide a method of inserting a bearing member which is engaged with a supporting rod into a desired position of a hollow space of a sun visor simultaneously when the sun visor is formed.

One of the six major objects of this invention is to provide a method to cause the engagement of supporting rod with said bearing member prior to inserting said bearing member into the hollow space of the sun visor.

The fourth object of the invention is to lock said bearing member in an eyelet shape to predetermined concave portions formed on the inner surface of the sun visor shell.

Another object of this invention is to make use of a hole as the insert hole of the supporting rod after withdrawal of the retaining rod, said hole being formed at the time of making the sun visor as an insert hole of a retaining rod of the sun visor shell, one end of which is engaged with said bearing member inserted into the sun visor, and it obviates the extra process of providing this necessary hole at a later stage of manufacturing the sun visors.

The other of the six major objects of the present invention is to provide a new and single method of manufacturing sun visors or glare shields in one processing of the materials. The bearing member, the supporting rod, and any necessary fixing articles of metal may be prearranged in a set thereof, and when the sun visor is being formed, all the members may be inserted into the desired positions at one and the same time.

The present invention is made to provide either one of the six objects or any number of them combined, thereby putting sun visors or glare shields into commercial practice.

Other objects and advantages of the present invention will appear from the following description taken with the accompanying sheets of drawings in which:

FIG. 1 is a perspective view of sun visors or glare shields, some portion of which is notched;

FIG. 2 is a view similar to FIG. 1, but showing the finished product of this invention in plan;

FIG. 3 is a longitudinal sectional view of the sun visor or glare shield taken along the line X–X' of FIG. 2;

FIG. 4 is a longitudinal sectional front view, showing a new apparatus so designed as to produce the sun visor or glare shield most effectively according to this invention, particularly the essential parts thereof shown;

FIG. 5 is a view similar to FIG. 4 showing the essentials of the system in connection with forming the visor or glare shield;

FIG. 6 is a longitudinal sectional front view showing in part the retaining part of the supporting rod to have the bearing member attached thereto;

FIG. 7 is a longitudinal sectional side view showing the same positions of said part shown in FIG. 6;

FIG. 8 to 11 are modified types of apparatuses for manufacturing the sun visor or glare shield.

In particular, FIG. 8 is a longitudinal sectional front view showing the main parts of a newly-designated manufacturing apparatus;

FIG. 9 is also a longitudinal sectional front view showing a revised machine before the manufacturing process starts;

FIG. 10 is another longitudinal sectional front view showing the chief portions of a newly-designed apparatus shown in FIGS. 8 and 9, but showing the portions during the operation thereof;

FIG. 11 is a front view showing the essential parts of the supporting rod engaged with a bearing member;

FIG. 12 is a front view showing one inside portion of a splicing mold;

FIG. 13 is a sectional view taken along the line X–X' of FIG. 12;

FIGS. 14, 15 and 16 are sectional views showing the main parts of a bearing member being inserted into sun visors or glare shields after completion of them.

In order to accomplish the above described objects of the present invention, the characteristics and features of the new method can be readily understood by the following description and drawings attached hereto.

One of the primary effective features is to employ a splicing mold comprising of two partial molds both of which have a concave surface corresponding to the desired contour of sun visors or glare shields to be manufactured.

Another feature of this invention is to support the bearing member by the retaining rod in the middle portion of the space which is formed between the inner surfaces of the both molds when detached at a predetermined distance.

The third striking feature of the construction of this invention is characterized in that the base portion of the supporting rod is held so that the bearing member is provisionally engaged with the supporting rod to be placed at the predetermined middle portion of the space between opposing inner surfaces of the two partial molds when they are detached.

One of the outstanding features of the invention is that such locking portions as recesses, bores and notches of suitable form are so provided on the locking member as to mesh correspondingly with projecting pieces and grooves formed on the inner surfaces of two partial molds.

The other feature of this invention resides in that a hole is formed when said two partial molds are spliced by two grooves which opposingly face each other on both molds, said hole is passed through by the retaining rod of the bearing member when forming the body of the sun visor and by the supporting rod engaged with the bearing member when completing the sun visor. This is to avoid of any danger inherent in the prior art that the locking piece of a bearing member was pinned onto the surface of the sun visor. In other words, the advantage of the manufacturing method of this invention will be readily found and understood in that a bearing member and/or other suitable members may be inserted into the hollow space of a generally elongated quadrangle shape glare shield not to be fully buried thereunder, and that a locking piece part of said member may be retained in an eyelet shape to some portion of the shell of the sun visors or glare shields.

This invention is easily put into commercial practice, particularly for manufacturing sun visors or glare shields of assured safety for use in motor vehicles.

The material to be in use for the production of the present invention is one which becomes plastic by heating and is formed to the desired shape by cooling, for example, thermoplastic resins such as polyvinyl chloride, polyvinyl acetate, polyethylene, polypropylene, polyamide, acrylic acid, polycarbonate in either monomer or copolymer form. The form of the material mentioned above may be preferably of a plate of any suitable thickness when it is fed to the machine according to the procedure of the present invention. Further, it should be noted that both surfaces of the sun visors or glare shields are formed simultaneously by supplying two sheets of the prearranged material mentioned above in parallel to the machine for manufacturing the desired product. Or the material may be fed to the machine during operation of the present invention in the form of a loop. Further, particular characteristics of the materials must be maintained in the quality of the raw materials, such as in thermoplastic synthetic resins no deformation should be noticeable when the product is fully exposed to the sun and the like, and the material of the thermoplastic resins should be sufficiently rigid even after it receives an outer force while in use. These two qualities are essential in any one of the materials mentioned hereinbefore or any combination for the manufacturing of the sun visors or glare shields.

Moreover, special attention should be drawn to the fact that a fully sufficient thickness of the sun visor or glare shield would play an inevitably important role in its durability, which should be taken into consideration.

Thermoplastic material in plate form to be fed onto the machine for the manufacturing process according to this invention should have essentially both hardness and thickness to a suitable degrgee to resist any deformation to be met with at a normal temperature; however, thickness of the thermoplastic plate may lessen while the process is being carried out, and such a deformation in thickness can be corrected by adding extra thickness in advance to the plate of thermoplastic resins.

As seen in the foregoing description of features and characteristics, as well as the materials involved, the present invention is in a position to provide a countless number of modifications by those skilled in the art by changing the form of the thermoplastic plate and the form and structure of the bearing member.

Referring to FIGS. 1, 2 and 3 by numerals of reference, the present invention includes a substantially elongated quadrangle body 71 composed of two thermoplastic shells 1, 2 forming a hollow space 72 between them. The bearing member 73 is preferably constructed of steel, stainless steel or any other similar material having a portion of pipe shape 3 and a locking piece 4 mounted on one side of said portion of pipe shape 3. The bearing member 73 may be inserted longitudinally so that inner projecting portions 7 formed by recesses 6 on both shells 1, 2 of the body 71 are to be found opposite to holes 5 provided on the locking piece 4 of the bearing member 73, thereby locking bearing member 73 to be inserted into the body 71 of the sun visor or glare shield, in eyelet shape and the front part of supporting rod 74 may be fixed into the pipe shaped portion 3 of the body 71. The base end of the supporting rod 74 is provided with a metal fitting 75.

In order that the two shells 1, 2 of the body 71 may be simultaneously formed, split or splicing mold 78 includes two partial molds 76, 77 shaped so as to form a concave part 9 to correspond to one surface of the contour of the finished product and also to form a projecting ridge on the outer periphery of said concave parts 9, the concave parts 9 being formed within the mold 78. The concave parts 9 are provided with an open hole made with convex parts 11, which are flush with a locking piece 4 of a bearing member 73 to be inserted into the hollow space 72 of the generally elongated quadrangle body 71 of the product of the present invention and further a semi-circular-in-section groove 12, through which the supporting rod 74 is inserted into the body 71 to engage with the pipe shape portion 3 of bearing member 73, on each concave 9. As is shown in FIG. 13, partial molds 7, 8 have a cooling chamber 18, wherein water runs through a water supply pipe 19 fixed in a hole 91 and is discharged through a drainpipe 20 mounted in a hole 92, and said partial molds may be attached to the pedestals 17 by means of threaded bores 93. Thus, the shape formed by the concave portions 9 of the two partial molds 76, 77 which face toward the inside, may be so set as to correspond to the contour figure of the body 71 of a sun visor or glare shield manufactured according to this invention. Guide bars 13 are mounted on the partial mold 76 so as to make both partial molds 76, 77 mesh with each other effectively and accurately, and are connected in the hole 122 made on the partial mold 77. The two shells of the body 71 which are located in a mold having the desired depth are formed simultaneously so that bearing member 73 may be inserted into the desired position of the body 71 by means of splicing mold 78. It makes no difference whether the thermoplastic resins as a material, are fed to the manufacturing machine in a looped form or in a parallel set of two sheets thereof.

When the material 79 of thermoplastic properties is fed to the splicing mold 78 in a melted and semi-fluid state, the devices shown in FIGS. 4 and 5 are used. As seen from FIGS. 4 and 5, the extruding and forming machine 80 includes a circular discharge mouth 14 which may be movable downward and an air blow-off pipe 15 projectingly mounted on the middle of said discharge mouth 14. On the assumed central vertical line of circular discharge opening 14, two partial molds 76, 77 of the splicing mold 78 are oppositely placed, power cylinders 82 are horizontally placed in an opposing manner to assure an outward movement of partial molds 76, 77 thereby effecting a constant contact of the outer sides of the molds 76, 77 and pedestals 17 of spindles 16 of the cylinders 82. Threaded rods 90 are inserted into pedestals 17 so that the partial molds 76, 77 may be connected with pedestals 17 while they are communicated with water supply pipe 19 and drainpipes 20 in the cooling chambers 18 through which a constant cooling stream of water is circulated. Furthermore, at the lower position of the two partial molds 76, 77 and on the assumed central vertical line of the circular discharge mouth 14, a power cylinder (not shown) is provided with a pedestal 22 retained on the upper end of a spindle 21, and the pedestal 22 is provided with a longitudinal hole 23 for the purpose of fixing with the axis line identical to the central line of said circular discharge opening 14. The hole 23 includes on its one end a key way 83.

In the course of manufacturing the substantially elongated quadrangle body 71 of the sun visor or glare shield according to the present invention, the retaining rod 24 to hold the bearing member 73 is provided with a collar 25 which regulates its height contacting the upper surface of pedestal 22, and additionally with a key 26 which controls the rotation of the retaining rod 24 fixed in the key way 83 in the hole 23 formed below the collar 25. The retaining rod 24 is further furnished with a convex ridge 27 which prevents the rotation of bearing member 73 over the collar 25, and is also provided with a projected portion 28 which stops the downward movement of the bearing member 73.

The spindle 21 and the pedestal 22 may be moved downward below the splicing mold 78 first, to make the bearing member 73 vertical by inserting the lower part of the retaining rod 24, retained by means of a pipe-shaped portion 3 of the bearing member 73, into the hole 23 of the pedestal 22. As seen in FIG. 4 the bearing member 73 may be moved forward together with a spindle 21 and the pedestal 22 so that two partial molds 76, 77 may be placed oppositely at a desired position. This is the second procedure during which the resin plate 79, in looped form and required thickness, which may be in advance well heated and fully mixed to be in fluid form, can be gradually extruded out of the ring opening 14 of the cross die-head 81 and flow out downward. The spindles 16, of power cylinder 82 which are positioned horizontally move forward simultaneously when the lower end of the looped resin plate 79 arrives at the lower portion of the space between the two partial molds 76, 77, and further, as can be understood from FIG. 5, looped resin plate 79 may pile up on opposite concaves 9 inside the splicing mold 78 when two partial molds 76, 77 may be joined together for construction of a splicing mold 78, and a high pressure air may be introduced into looped resin 79 of thermoplastic material through an air blow-off pipe 15 in the middle of the ring opening 14. Then the said looped resin 79 in the splicing mold 78 may be cooled by cooling water circulating in the cooling chambers 18, and more particularly, the looped resin plate 79 laid on the concave portions 9 may be cooled by water in the cooling chambers 18, so as to form a desired shape.

Special reference should be taken to the present invention in the manufacturing process in which a finished product may be obtained by the looped resin plate 79 being put onto and formed in the splicing mold 78 with additional blow-in of high pressure air onto the plate 79.

The bearing member 73 is positioned at a desired place by means of retaining rod 24 between an opposite pair of partial molds 76, 77 of the splicing mold 78, and the partial molds 76, 77 connect the bearing member 73 firmly with the mold 78 when the two molds 76, 77 meet together. As the partial molds 76, 77 are connected so as to construct the splicing mold 78, the projecting pieces 11 mounted inside the concave parts 9 press the resin plate 79 into an opening 5 of the locking piece 4 of the bearing member 73 thereby producing inner projecting pieces 7 in the recess 6 of the resin plate 79 on both sides to be linked by pressing in of the projecting pieces 11 and the locking piece 4 of the bearing member 73 is retained in an eyelet shape. Then the spindles 16 of power cylinder 82 may be moved backward so that the two partial molds 76, 77 may be separated, and the resin plate 79 of the desired shape may be taken out of the mold 78, and then the retaining rod 24 which has held bearing member 73 in position during the formation process may be taken out. It would be understood that the bearing member 73 may be left inserted in the upper end of the hollow space 72 formed by shells 1, 2 which are in parallel on both sides of body 71. After the retaining rod 24 which holds bearing member 73 is taken out, the bores in the body 71 produced during the manufacturing process, are in alignment with the pipe-shaped portion 3 of bearing member 73 and the tip portion of supporting rod 74 with a metal fitting 75 mounted on the root portion thereof may be easily fixed on the body 71. The bearing member 73, which is inserted into and locked in the hollow space 72 while forming the body 71, may be provisionally retained onto the tip portion of supporting rod 74 and the supporting rod 74 may be retained on the outside portion of splicing mold 78 so that the bearing member 73 may be positioned at a predetermined place as described hereinbefore, thus the manufacturing process of the present invention may be carried out at one and the same process.

The above process may be obtained simply by providing a means to retain the supporting rod 74 to the spindle 21 which are arranged vertically below the splicing mold 78. As shown in FIGS. 6 and 7, the embodiment of the invention is that the pedestal 22, fixed in the end portion of a spindle 21, may be provided with a fixing hole 85 with a key way 84 extending downwardly from its upper center portion, and a front-bulged locking piece 87 may be idly inserted into the lateral hole 86 made in the pedestal 22 to be projected into the hole 85. A coil spring 89 may be inserted compressively between the front part of locking piece 87 and a clamping lid 88 of the lateral hole 86. A collar 94 may be projectingly provided on the upper end of a rod 93 which is inserted from the upper direction into the hole 85, the upper portion of the collar 94 being joined by a screw rod 95 of a larger diameter, the rod 93 may be provided with both a key to be fixed in the key way 84 and a concave portion 97 to correspond to the locking piece 87. Further, screw rod 95 is provided with semi-circular holes 99 in a section on its upper portion into which right and left grasping pieces 98 for fixing supporting rod 74 are inserted while a threaded portion 111 is preferably mounted at the lower and outer edge of grasping pieces 98 to be connected with the screw rod 95, so that left and right grasping pieces 98, may be opened downward by hinging the lower parts of the grasping pieces 98 on the central projected piece 100 mounted on the top end of the screw rod 95. The remaining rod 113 may be constructed by screwing both threaded portions 111 on the lower and outer edge of the grasping pieces and a threaded tube 112 which abuts witth the upper, outer edge of the screw rod 95. The bearing member 73 may be engaged with the front portion of supporting rod 74 which may be previously provided with a metal fitting 75 for fitting and supporting by means of a pipe-shaped portion 3, and then a locking piece 4 may be provisionally held in position against the supporting rod 74 by inserting screws 114 into threaded openings mounted on the locking piece 4 of the bearing member 73. Then the threaded tube 112 on the retaining rod 113 may be screwed downward, grasping pieces 98 being open outward in both directions, the supporting rod 74 provided with a metal fitting 75 may be mounted and clamped onto a fitting hole 99 formed by said grasping pieces 98 and at the same time the threaded tube 112 may be spirally moved upward thereafter, the threaded tube 112 being fixed on the threaded parts 111 on the outer edge of grasping pieces 98. Therefore, the threaded tube 112 may tighten the grasping pieces 98 and clamp the supporting rod 74, thereby the supporting rod 74 provisionally retaining bearing member 73 and provided with a metal fitting 75 on its base portion, is held firmly on retaining rod 113. Then, as is seen from the foregoing description, a spindle may be moved forward, and the bearing member 73 may be predetermined and interspacedly held between two partial molds 76, 77 of splicing mold 78 thereby forming simultaneously both shells of the body 71 of sun visor or glare shield according to the manufacturing method of the present invention by which the bearing member 73 may be inserted into a hollow space 72 of said body 71. By this, a speedy and time-saving mass-productable one-step manufacturing method of sun visors or glare shields may be obtained. Namely, a full manufacturing process may be over with the supporting rod 74 fixed with a metal fitting 75 engaged with the bearing member 73 which may be preferably inserted and locked in the hollow space 72 of the body 71. A buffer core 116 of plate shape may be mounted on the bearing member 73 so as to be arranged in the hollow space 72 of the body 71 of thermoplastic properties.

The foregoing description, when taken together with the accompanying drawings explain a manufacturing process and an apparatus to carry out the present invention characterised in that a material 79 for the production of sun visors or glare shields may be fed in a melted and fluid state to the manufacturing machine during the operation of the manufacturing process. FIGS. 8 to 10 show an apparatus onto which the material 117 of thermoplastic qualities may be predeterminedly fed in the form of flat plate. Vertical shafts 29 may be provided with two base discs 30 which may be moved up and down. Spindles 31 mounted on the outside of discs 30 may be communicated with the inner ends of a perpendicular set of two power cylinders 118. In the portion formed by said two discs 30, two partial molds 76, 77 for the construction of splicing mold 78 may be so mounted so to provide suction rooms 32 which may be communicated with concave portions 9 of splicing mold 78 by means of suction holes 33 suitably bored through the partial molds 76, 77 and the two partial molds 76, 77 may be provided with discharge pipes 34 by way of the suction rooms 32 which may be in communication with discharge pumps (not shown).

Two base discs 30 may be so closely placed together as to form a splicing mold 78 as shown in FIG. 10, base portion 36 may be fixed on the laterally movable spindle 35 of a power cylinder or any other suitable mechanism (not shown) which is fixed along the assumed line formed of two partial molds 76, 77 when they completely form the splicing mold 78, a holding pipe 38 with openings 37 on its surface may be horizontally fixed on base portion 36 which is communicated with high pressure air accumulator (not shown) and a holding rod 38 by means of an air supplying pipe 39, as seen in FIG. 9. Further, a heating plate 119 of an electric heater and the like is so mounted so as to move into the middle of a space left open by two partial molds 76, 77 when the molds 76, 77 of splicing mold 78 are opened and placed separately as shown in FIG. 9.

When the two partial molds 76, 77 forming the splicing mold 78 are opened and placed apart, thermoplastic resin plates 117 may be placed on the inside of the partial molds 76, 77 in a belt form, and the bearing member 73 may be held in position at the extreme left portion of the holding rod 38 by being inserted into the pipe-shaped portion 3. Into the middle of resin plates 117 on the inside of opened splice mold 78, a heating plate 119 may be inserted to radiantly superheat the resin plates 117 to be formed in a melted and fluid state, and then the heating plate 119 is withdrawn as the spindle 35 is moved forward in a level manner, and the base portion 36 may be moved forward until the bearing member 73 retained on the holding pipe 38 can be inserted into the middle of space formed by upper and lower resin plates 117. As the spindles 31 of power cylinders 118 with an upper and lower set of partial molds 76, 77, move inward, the molds 76, 77 may be closed and the bearing member 73 may be encased on both sides by the resin plates 117, which are in effect clamped by the splicing mold 78 in an airtight manner. Then high pressure air may be blown in through air supply pipe 39, the high pressure air may be pressed into the gap of resin plates 117 by openings 37 of holding rod 38, the atmospheric pressure of air suction rooms 32, may be lowered by discharging air by air discharge pipes 34. Resin plates 117 in a melted and fluid state may be substantially enlarged by the blown-in high pressure air on either side and may be formed on concave portions 9 of partial molds 76, 77 as the air which resides in small gap between resin plates 117 and the surfaces of the concave portions 9 may be discharged through air suction ports 33 into air suction rooms 32 wherein the atmospheric pressure gets lower and lower. In the course of this period, a particular feature of the operation of the present invention may be accomplished when the two partial molds 76, 77 which are to form a splicing mold 78 are provided with bearing member 73 inserted inbetween the two partial molds.

Attention should be drawn to the feature of the present invention wherein a bearing member 73, retained by a horizontal holding rod 38, is inserted into a suitable place in the middle of a space formed by resin plates 117 oppositely placed on two partial molds 76, 77 to construct a splicing mold 78. The bearing member 73 may be clamped by an opposite pair of resin plates 117 inside the splicing mold 78 when the two partial molds 76, 77 firmly and closely meet together to form a mold 78. When an integral form of thermoplastic resins 117 is attained, projecting pieces 11 formed on concave portions 9 may be inserted into openings 5 mounted on locking piece 4 of bearing member 73 by pressing and forming recesses in the resin materials 117 in either direction. Thus, inner projecting pieces 7 formed on the underside of recesses 6 may become integral with projecting pieces 11 by the latter's clamping pressure thereby retaining the locking portion 4 of bearing member 73 in an eyelet shape. Then, by cooling the splicing mold 78, the resin plates 117 in a melted and fluid state may be lowered in temperature and become solid and thereafter the spindles 31 of power cylinders 118 may be moved outward to open separately the partial molds 76, 77 of splicing mold 78. The finished form of a sun visor or glare shield according to this invention will retain the holding pipe 38 of bearing member 73 inside thereof and the sun visor will be completed by withdrawing said holding pipe from the bearing member 73.

Thus the hole made on the body 71 spontaneously by taking out the holding tube 38, which was holding bearing member 73 during the forming process, will be aligned with the portion of pipe shape 3 of the bearing member 73. This makes it easier to engage the supporting rod 74, carrying the metal fitting 75 at one end thereof, with the said portion of pipe shape 3 which makes it unnecessary to provide a necessary hole for inserting supporting rod 74 on the body 71 at a later stage of the production.

It is also possible in this device to form the body 71 in such a manner that the supporting rod 74 is being engaged with the bearing member 73, having a metal fitting 75 at one end thereof, the opposite end of which is inserted into the body 71 and retained at a predetermined position to serve as a lock for the body 71. This process may be performed using the retaining rod 113 with such means as those illustrated in FIGS. 6 and 7 attached to the pedestals 36 of the spindle 35 horizontally movable in either a forward or rearward direction, and the surface of the heating-plate 119 disposed to melt the thermoplastic resin plates 117 is covered by thin frame box 122 which does not hinder the heating effect thereof and the said box is connected with the pedestal 36 similar to pedestal 22 illustrated in FIGS. 6 and 7, and then supporting rod 74, which is to be inserted into the bearing member 73 for temporarily holding it and has metal fitting 75 on one end thereof, is fixed to the retaining rod 113 which is then put in the said pedestal 22. In drawing out the heating plate 119 after completion of the heating operation for the said thermoplastic resin plates 117, it should be pulled out of partial molds 76, 77 so that the bearing member 73 is placed at the predetermined position between the two detached partial molds 76, 77 and thus the subsequent process of forming treatment can be carried out. In this case, it should be performed by another air supplying tube similar to said air supplying pipe 15 to puff the compressed air into the space between the two resin plates 117 which are laid respectively on each inner surface of partial molds 76, 77 when the forming process is taking place in such way that the supporting rod 74 having the fitting 75 at its end and interlocked with the bearing member 73 is inserted into the hollow space 72 of the body 71.

In the manufacturing process of this invention, the materials of the bearing member 73, which is to be sandwiched in and supported at the desired position in the hollow space 72 of the body 71, may be made of metal such as iron, aluminium etc., or of synthetic resin such as polycarbonate resin or polyamide resin etc. The shape and the disposition of the bearing member 73 in the hollow space of the body is not restricted to those examples illustrated in the attached figures hereto, and yet, the length of the bearing member 73 may either extend full length in the longitudinal upper portion of the hollow space 72 of the body 71 or extend a partial length thereof from opposite sides. It may also be possible to affix some other members to the bearing member 73, and the locking means for the bearing member 73 in the hollow space 72 of the body 71 can be changed according to requirements.

Preferable examples of those locking means for the bearing member 73 are shown in FIGS. 14, 15 and 16 respectively. With reference to FIG. 14, the locking piece 4 of the supporting rod 74 has two convex ridges 120 projecting in opposite directions to each other at the position above and below the piercing opening 5 formed on the locking piece 4. The disposition of these convex ridges 120 is essential and it is also necessary to form a concave groove 125 on the concave surface 9 of the splicing mold 78 in a shape corresponding to convex ridge 120. When the body 71 is formed with the plastic plates 117 or 119 by the manufacturing method of this invention utilizing bearing member 73 having the convex ridges, the convex ridges 120 disposed on the locking piece 4 fixed to the bearing member 73 may be engaged and firmly attached to the concave groove 125 to be formed at the inside surfaces of both shells 1, 2 resulting in making linear ribs which reinforce the body 71.

FIG. 15 shows that the locking piece 4 of bearing member 73 has upper and lower concave grooves 121 depressed in opposite directions to each other. In this example, two convex ridges are necessarily formed in a shape in relation to that of concaves 121 on the inner concave surfaces 9 of the splicing mold 78. If the body 71 is formed with the resin plates by this process, the inward convex ridge 124 formed on the surfaces of the shells 1, 2 will engage with the respective concave groove disposed at the locking portion 4 of the bearing member 73 and be ridgedly fixed thereto.

FIG. 16 shows a most important embodiment of this invention. In this example, the bearing member 73 is provided with a piercing opening 5 on the locking piece 4 attached to the portion of pipe shape 3 and extending vertically therefrom, the outer surface of the said bearing member 73 being covered with shock absorbing materials 116 such as synthetic resin, rubber or other porous material having elastic properties. The body 71 may be so formed with two resin plates shaped simultaneously as to retain the bearing member 73 in the hollow space 72 by means of the said device illustrated in the various figures of the drawings. In the product thus produced, the bearing member 73 retained at a desired position in the hollow space 72 of the body 71 is wrapped with the said shock absorbing material 116. The sun visor or glare shield manufactured under the process of this invention mainly comprises a flat shell construction shaped with resin plates, the bearing member to be engaged with the supporting rod for fixing the body to motor vehicles is retained in the hollow space of the body, and the locking piece disposed vertically to the bearing member is rigidly fixed to the body by means of an eyelet of the said locking piece, will increase the degree of safety of the human body on the occasion of motor vehicles' collision. This is because when a motor vehicle suddenly stops due to a collision or emergency brake the heads of the persons in the vehicle collide with the sun visor installed inside the car, and the sun visor will absorb the impact force as it can temporarily deform at that very instance because of its flat hollow construction, and yet, human bodies will not collide directly with the naked bearing member and the supporting rod engaged therewith since they are completely covered with resin material of the shell construction as those metallic components are inserted into the hollow space and retained therein. Further, no fixing metallic pieces such as pins, bolts and nuts are used as locking bearing members and hard metal pieces are not exposed on the outer surface of the body by using locking means of eyelet shape. In this case, the bearing member will not be completely buried under the shell construction but it is merely inserted into said construction and locked therein at the desired relative position and consequently there is no fear of the bearing member detaching from the shell member even if the body is temporarily deformed by a collision with the human body. Thus, the product may readily be deformed so as to adsorb or relieve the impact force. As a result, the sun visor or glare shield thus produced has a high degree of safety and is neatly packed with substantially elastic materials.

What I claim is:

1. A method of manufacturing a sun visor or glare shield article for motor vehicles, comprising the steps of:
   (a) defining a concave shape on inner surfaces of a pair of partial molds of a split mold, said shape defining the contours of a body to be formed;
   (b) providing convex ridge and concave grooves on the inner surfaces of the said partial molds in such shape and position so as to be opposite to the location of locking portions and openings arranged on a locking piece of a bearing member,
   (c) inserting and retaining a bearing member at a predetermined position between a pair of melted resin plates to be molded in the concave shapes of said two partial molds; and,
   (d) supplying molten resin to said partial molds to form melted resin plates and pressing said melted resin plates on the concave shapes of the said partial molds by splicing the said partial molds and then supplying compressed air into the space between said melted resin plates, the air residing in small gaps between said resin plates and the inner surfaces of the partial molds being discharged by discharge means at the time of supplying compressed air into the space between said joined resin plates, so that the resin plates are closely pressed on the inner surfaces of both partial molds;

whereby an article is formed with said resin plates having a hollow construction at the same time, the convex ridge and the concave grooves of the said partial molds being locked by the openings and the grooves arranged in the locking piece of the said bearing member, and thus an article of a substantially elongated quadrangle shape having disposed therein a bearing member with a pipe shape portion and a locking piece is completely formed.

2. A method of manufacturing a sun visor or glare shield article for motor vehicles as defined in claim 1 wherein the forming process includes the step of using a supporting rod held firmly at the outside of the said partial molds so the bearing member will be located in a predetermined position between the inner surfaces of said two partial molds, said supporting rod being provisionally engaged with said bearing member.

3. A method of manufacturing a sun visor or glare shield article for motor vehicles defined in claim 1 wherein the resin plates supplied by an extruding and forming machine in melted and fluid state are laid on the inner surface of said two partial molds, thereby both shells of said body are formed simultaneously.

4. A method of manufacturing sun visor or glare shield article for motor vehicles as defined in claim 1 wherein resin plates to be shaped into shells of the article at the time of separation of splicing mold are laid and retained on the inner surfaces of both partial molds and heated to a melted and fluid state by a heating body inserted between the said resin plate, whereby both shells of said article are formed simultaneously.

5. A method of manufacturing a sun visor or glare shield article for motor vehicles defined in claim 1 wherein all or part of the outer surface of said bearing member, which is inserted in a predetermined position in the space between the two resin plates in melted and fluid state to be laid on the inner surface of both said partial molds and supported at that position, is covered by resilient or porous elastic material whereby said body is given a shock absorbing capability.

References Cited
UNITED STATES PATENTS

| | | | |
|---|---|---|---|
| 3,242,245 | 3/1966 | Greig et al. | 264—92 X |
| 3,281,283 | 10/1966 | Ralph | 264—98 X |
| 2,454,613 | 11/1948 | Peltier et al. | 296—97.95 |
| 3,401,976 | 9/1968 | de Coye de Castelet | 296—97.58 |
| 3,452,125 | 6/1969 | Schurman et al. | 264—98 X |

ROBERT F. WHITE, Primary Examiner

R. H. SHEAR, Assistant Examiner

U.S. Cl. X.R.

18—5 BZ; 264—249, 273, 274; 296—97